Figure 1:
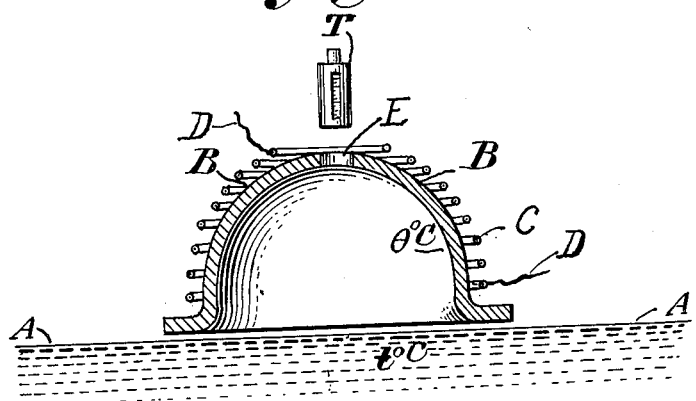

June 19, 1962   KAMEKICHI SHIBA   3,039,308
APPARATUS AND METHOD FOR MEASURING SURFACE TEMPERATURES
Filed Sept. 23, 1957

KAMEKICHI SHIBA
INVENTOR.

BY Wenderoth, Lind & Ponack
ATTY.

3,039,308
APPARATUS AND METHOD FOR MEASURING
SURFACE TEMPERATURES
Kamekichi Shiba, No. 159 Kagomachi, Bunkyoku,
Tokyo, Japan
Filed Sept. 23, 1957, Ser. No. 685,647
Claims priority, application Japan Oct. 10, 1956
5 Claims. (Cl. 73—339)

The present invention relates to an apparatus and method for measuring surface temperatures.

The thermometers for temperature radiation, such as radiation pyrometers and photocell pyrometers are the usual instruments for measuring surface temperatures. However, these instruments are only correct provided the surface whose temperature is to be measured is black. The apparatus and method herein described provides means for measuring the temperature of non-black surfaces with the above mentioned thermometers and the system is especially suitable for measuring the surface temperature of rotating cylinders.

Figure 2:
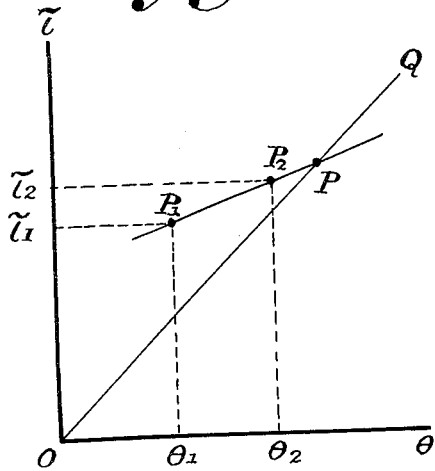

With the above and other objects in view which will become apparent from the detailed description below, a preferred form of the invention is shown in the drawings in which:

FIGURE 1 is a cross-sectional view through the apparatus and a portion of a surface whose temperature is to be measured, and FIGURE 2 is a graph illustrating the method of securing the required temperature.

Referring to FIGURE 1, AA shows a portion of a surface whose temperature $t°$ C. is to be measured. B shows a cross section such as a hollow vessel, generally cup shaped, having an aperture E therein. A thermometer T is positioned opposite the aperture E and is spaced therefrom as shown in FIG. 1. The temperature $\theta°$ C. of the inner surface of the cup B may be varied by any desired means such as the electrical coils C having the leads D which may be connected to any suitable source of supply which is capable of being definitely controlled by any suitable means.

The cup B is not necessarily in contact with the surface AA and there may be some clearance between the cup and such surface.

The surface temperature of the surface AA is measured with a radiation thermometer T and the temperature reading may be represented as $\tau°$ C.

Then in order to secure the required value of $t$ the operation is carried out as follows:

Regardless of the emissivity of the surface, $$\tau = t, \text{ when } \theta = t$$

$$\theta \gtrless \tau \gtrless t, \text{ when } \theta \gtrless t$$

The reading of the thermometer T is dependent on the inner surface temperature $\theta$ of the cup and surface temperature $t$ and is also dependent on the shape of these surfaces.

If parameters $x, y, z \ldots$ are used to represent the shape then, $\tau$ is a function of $t, \theta, x, y, z \ldots$. If the said function is $$\tau = \varphi(t, \theta, x, y, z \ldots)$$

then, $$d\tau = \frac{d\varphi}{dt}dt + \frac{d\varphi}{d\theta}d\theta + \frac{d\varphi}{dx}dx + \cdots$$

If $t, x, y, z, \ldots$ are kept constant and only $\theta$ changed, $d\tau$ will be $$d\tau = \frac{d\varphi}{d\theta}d\theta$$

Therefore, if $$\theta = t, \text{ then } \tau = t$$

and $$d\tau = \left(\frac{d\varphi}{d\theta}\right)\theta = t^{d\theta}$$

When $\theta = t + d\theta$, the reading $\tau$ of the thermometer T will be $$\tau = \varphi(t, t+d\theta, x, y, z \ldots) = \varphi(t, t, x, y, z \ldots)$$

$$+ \frac{d\varphi}{d\theta}d\theta = t + \frac{d\varphi}{d\theta}d\theta$$

Since $$t - \tau = -\frac{d\varphi}{d\theta}d\theta$$

and $$d\theta = \theta - t, t - \tau = -\frac{d\varphi}{d\theta}(\theta - t) = \frac{d\varphi}{d\theta}(\theta - \tau) - \frac{d\varphi}{d\theta}(t - \tau)$$

Then, $$(t - \tau)\left(1 + \frac{d\varphi}{d\theta}\right) = \frac{d\varphi}{d\theta}(\theta - \tau)$$

or is, $$t - \tau = \frac{\frac{d\varphi}{d\theta}}{1 + \frac{d\varphi}{d\theta}}(\theta - \tau) = k(\tau - \theta)$$

Therefore, since $$k = -\frac{\frac{d\varphi}{d\theta}}{1 + \frac{d\varphi}{d\theta}}$$

If $t, x, y, \ldots$ do not change, $k$ = constant.

Therefore, in the case of the temperature difference $(t - \theta)$ being small, $$t - \tau = k(\tau - \theta)$$

where $k$ is a constant independent of $\theta$. It depends on the dimensions of the inner surface of cup B and the emissivity of the inner surface of the cup B. This equation shows that $\tau$ varies linearly with $\theta$, and the relation between $\theta$ and $\tau$ is represented by a straight line, the ordinate and abscissa being $\tau$ and $\theta$ respectively.

To obtain the temperature $t$ of the surface, at least two measurements are necessary. First, the inner surface of the cup is kept at a temperature $\theta_1$, and the second it is kept at a temperature $\theta_2 (\theta_2 \neq \theta_1)$. The corresponding values of $\tau$ are $\tau_1$ and $\tau_2$ respectively. Two points $P_1(\theta_1, \tau_1)$ and $P_2(\theta_2, \tau_2)$ are plotted in a graph, of which the ordinate is $\tau$ and abscissa is $\theta$, as shown in FIGURE 2. The intersection P of the straight line $P_1P_2$ or its elongation and the straight line OQ, which represents the relation $\tau = \theta$, gives the required value of $t$.

The influence of $\theta$ on the value of $\tau$ decreases with an increase in the value of $k$. To reduce the value of $k$, it is necessary that the emissivity of the inner surface of the cup should be kept as small as possible, as for example, by gold plating.

To regulate the surface temperature $t$ by this system, preliminarily the temperature $\theta$ of the inner surface of the cup is maintained at a predetermined temperature by some adequate means, and then the surface temperature $t$ is controlled so that $\tau$ is equal to the predetermined temperature by some ordinary way, as for example, hot air or electrical means.

It is thought that the invention and its advantages will be understood from the foregoing description and it is apparent that various changes may be made in the process, form, construction and arrangement of the parts

I claim:
1. An apparatus for measuring surface temperature comprising a vessel having an aperture therein, a thermometer outside said vessel opposite said aperture and spaced therefrom, and means for heating said vessel for varying the temperature of the inner surface of said vessel to one of a plurality of predetermined temperatures.

2. An apparatus for measuring surface temperature comprising a cup having an aperture therein, a thermometer outside said cup opposite said aperture and spaced therefrom, and means for heating said cup for varying the temperature of the inner surface of said cup to one of a plurality of predetermined temperatures.

3. An apparatus for measuring surface temperature comprising a cup having an aperture therein, a thermometer outside said cup opposite said aperture and spaced therefrom, and means for electrically heating said cup for varying the temperature of the inner surface of said cup to one of a plurality of predetermined temperatures.

4. A method of measuring the temperature of the radiation from a non-black surface for determining the temperature of said surface, comprising placing a heat emissive surface having an aperture therein adjacent said non-black surface, heating said heat emissive surface to a first temperature and causing it to emit radiation toward said non-black surface, measuring the temperature of the radiation from said non-black surface which passes through the aperture in said heat emissive surface, heating said heat emissive surface to a second temperature and causing it to emit radiation toward said non-black surface, and measuring the temperature of the radiation from said non-black surface which passes through the aperture in said heat emissive surface, whereby the two temperatures thus measured can be plotted on a graph against the temperatures of said heat emissive surface which graph has a line thereon representing the relationship $\tau = \theta$, where $\tau$ = the temperature measured, and $\theta$ = the temperature of the heat emissive surface, and the values of $\tau$ and $\theta$ obtained by the intersection of the said line and a line through the points plotted can be substituted in the relationship $T - \tau$ equals $k(\tau - \theta)$, where $T$ equals the temperature of said non-black surface and $k$ is a constant depending on the dimensions of said heat emissive surface and the emissivity thereof, to obtain the value of the surface temperature of said non-black surface.

5. A method of regulating the surface temperature of a non-black surface to a desired temperature, comprising placing a heat emissive surface having an aperture therein adjacent said non-black surface, heating said heat emissive surface to a predetermined temperature $\theta$ having a value such that when it and the temperature $\tau$ opposite said aperture in said heat emissive surface are equal, the relationship $T - \tau$ equals $k(\tau - \theta)$ produces the desired temperature $T$, $k$ being a constant depending on the dimensions of said heat emissive surface and the emissivity thereof, and causing said heat emissive surface to emit radiation toward said non-black surface, and heating said non-black surface to cause the temperature adjacent said aperture in said heat emissive surface and on the side away from said non-black surface to equal said predetermined temperature, whereby the temperature of said non-black surface will be equal to the desired temperature.

References Cited in the file of this patent

UNITED STATES PATENTS

| | | |
|---|---|---|
| 2,785,860 | Harrison et al. | Mar. 19, 1957 |
| 2,837,917 | Machler | June 10, 1958 |
| 2,846,882 | Gray | Aug. 12, 1958 |

FOREIGN PATENTS

| | | |
|---|---|---|
| 681,835 | Great Britain | Oct. 29, 1952 |

OTHER REFERENCES

Harrison: "Industrial Use of Radiation Pyrometers under Non-Blackbody Conditions." J. Optical Society of America, 35: 11 November 1945, p. 708 et. seq., 709–11, are applicable. (Photostat available in Div. 36.)